US009867220B2

(12) United States Patent
Hassan et al.

(10) Patent No.: US 9,867,220 B2
(45) Date of Patent: Jan. 9, 2018

(54) TETHERING PARAMETERS FOR A TETHERING CONNECTION

(71) Applicant: Microsoft Technology Licensing, LLC, Redmond, WA (US)

(72) Inventors: Amer A. Hassan, Kirkland, WA (US); Paul William Alexander Mitchell, Seattle, WA (US); Paul W. Garnett, Albany, NY (US); Shadi Mahassel, London (GB); Pascal F. Menezes, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 269 days.

(21) Appl. No.: 14/321,286

(22) Filed: Jul. 1, 2014

(65) Prior Publication Data

US 2016/0007394 A1  Jan. 7, 2016

(51) Int. Cl.
*H04W 72/00* (2009.01)
*H04W 76/02* (2009.01)
*H04W 28/18* (2009.01)
*H04W 72/04* (2009.01)

(52) U.S. Cl.
CPC ......... *H04W 76/022* (2013.01); *H04W 28/18* (2013.01); *H04W 72/042* (2013.01)

(58) Field of Classification Search
CPC .................................. H04W 76/023

USPC ......................................... 455/450
See application file for complete search history.

(56) References Cited

U.S. PATENT DOCUMENTS

| 7,587,512 | B2 | 9/2009 | Ta et al. |
| 8,661,153 | B2 | 2/2014 | Ta et al. |
| 9,210,536 | B2 * | 12/2015 | Salkintzis ............. H04W 4/008 |
| 2012/0082148 | A1 | 4/2012 | Sperling et al. |
| 2012/0278466 | A1 | 11/2012 | Jallapelli et al. |
| 2013/0107783 | A1 * | 5/2013 | Shaw ...................... H04W 4/06 370/312 |
| 2013/0223346 | A1 | 8/2013 | Allen et al. |
| 2013/0316676 | A1 | 11/2013 | Nousiainen et al. |
| 2014/0094159 | A1 * | 4/2014 | Raleigh ................. H04W 24/02 455/418 |

OTHER PUBLICATIONS

Cho, et al.,' "Providing QoS and Rate Limiting for WiMAX Mobile Hotspots based on Policy and Charging Control Architecture", In Proceedings: International Journal of Control and Automation vol. 6, No. 4, Aug. 2013, pp. 217-226.

Keshav, et al.,' "Energy efficient scheduling in 4G smart phones for Mobile Hotspot Application", In Proceedings: National Conference on Communications, Feb. 3, 2012, 5 Pages.

Tabrizi, et al.,' "Tethering Over TV White-space: Dynamic Hotspot Selection and Resource Allocation", In Proceedings: IEEE 78th Vehicular Technology Conference, Sep. 2, 2013, 6 Pages.

* cited by examiner

*Primary Examiner* — Amancio Gonzalez

(57) ABSTRACT

Techniques for tethering parameters for a tethering connection are described. Implementations, for example, enable a tethered connection between a tethered device and a host device to be provisioned in various ways.

20 Claims, 14 Drawing Sheets

TETHERING PARAMETERS FOR A TETHERING CONNECTION

BACKGROUND

Many devices today utilize some form of wireless radio frequency (RF) data communication. Examples of wireless RF communication include cellular networks (e.g., for cell phones), data broadband (e.g., Wi-Fi®), broadcast television, global positioning system (GPS) navigation, and so forth. Wireless RF communication can be leveraged for various purposes, such as for communicating voice data, video data, application data, and so forth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for tethering parameters for a tethering connection are described Implementations, for example, enable a tethered connection between a tethered device and a host device to be provisioned in various ways.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
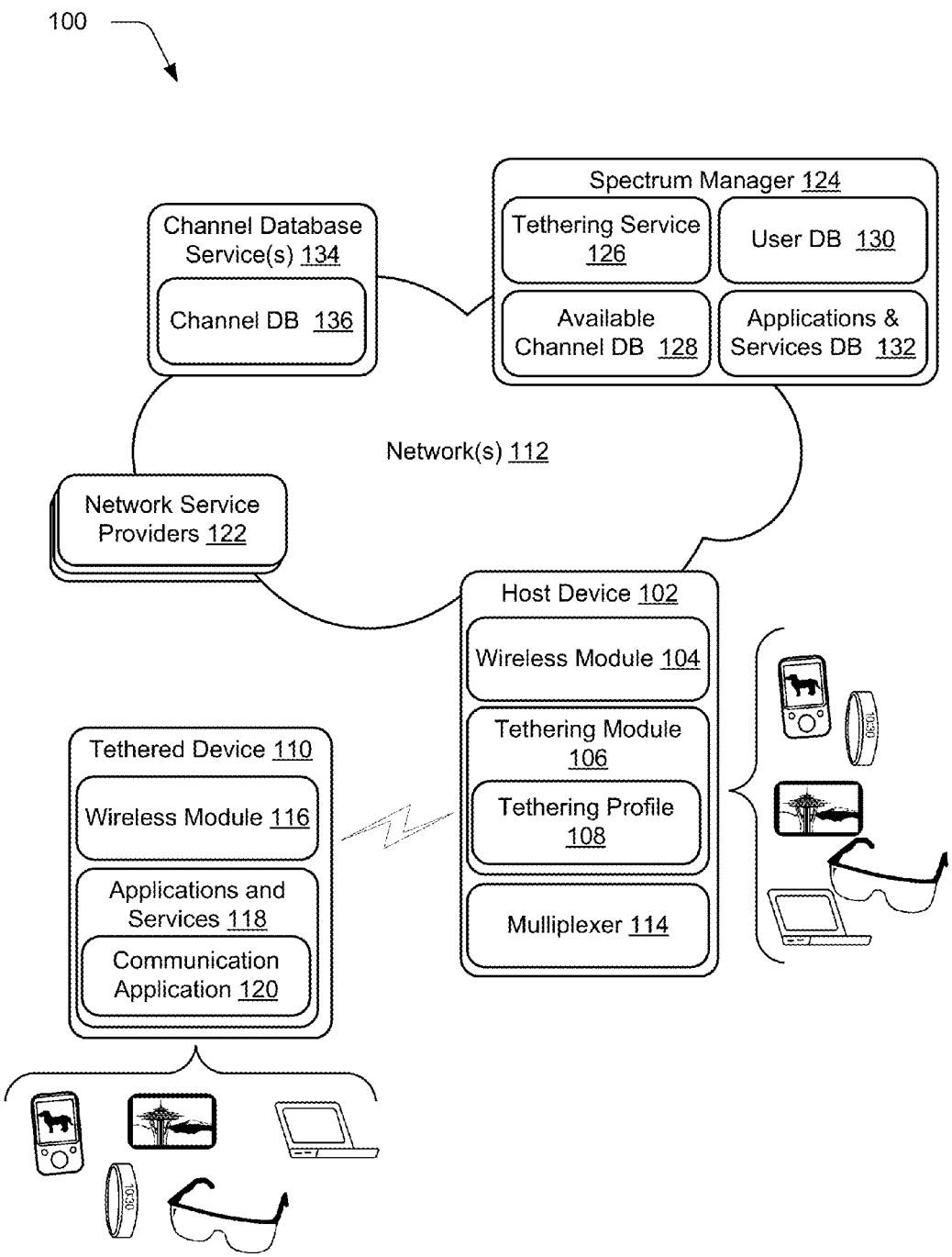
FIG. 1 is an illustration of an environment in an example implementation that is operable to employ techniques discussed herein in accordance with one or more implementations.

Techniques for tethering parameters for a tethering connection are described. Generally, "tethering" refers to connection of a tethered device to a host device to enable the host device to provide wireless connectivity to the tethered device. For instance, a host device may provide Internet and/or other network connectivity to a tethered device. In at least some implementations, both a host device and a tethered device are end-user devices.

As an example implementation scenario, consider that a first mobile device (e.g., a smartphone, a tablet, a laptop, and so forth) is connected to a network via a wireless connection, such as via a cellular data connection, data broadcast over TV whitespaces, broadcast over available guard bands, and so forth. Consider further that a second mobile device is in close proximity to the first mobile device. The mobile devices, for instance, may be in the same room, such as a conference room, a classroom, and so forth. According to one or more implementations, the second mobile device can wirelessly connect to the first mobile device to establish a tethered connection between the devices. The second mobile device can communicate wirelessly with the network via the first mobile device. The first mobile device, for instance, serves as a "host device" which hosts a network connection for the second mobile device, which may be considered a "tethered device."

Implementations enable a tethered connection between a tethered device and a host device to be provisioned in various ways. For instance, when a tethered device requests to be tethered to a host device, the tethered device can provide various information concerning attributes of the tethered device. The host device may then query a tethering service with the attributes of the tethered device. Based on the attributes of the tethered device, the tethering service can specify various tethering parameters to be applied to a tethering session between the host device and the tethered device. Examples of such tethering parameters include bandwidth to be allocated to the tethered device, service level for the tethered device, and so forth. The tethering service may also select wireless channels that may be allocated to the host device to enable the host device to provide the tethered device with a specified level of service. Examples of wireless channels that may be selected include white spaces in the radio spectrum (e.g., television (TV) white spaces), available cellular channels, guard bands between licensed portions of the radio spectrum, and so forth.

The tethering service may then notify the host device of the tethering parameters and the wireless channels. According to various implementations, the host device utilizes the wireless channels to transmit and receive (e.g., "communicate") wireless data, at least some of which is data received from and transmitted to the tethered device. The host device may also apply the tethering parameters to a tethered connection with the tethered device, such as to provide a specified level of service. Thus, implementations enable various tethering resources and parameters to be configured.

Implementations may employ a channel database that tracks available wireless channels and that can be queried for available wireless channels. Based on available wireless channels, various decisions can be made regarding how to leverage the available channels to provide tethering service to tethered devices. In at least some implementations, white spaces and/or guard bands can be leveraged to transmit wireless broadband data, such as for data transmission as part of a wireless local area network (WLAN). The data transmission, for example, can be performed according to the 802.11 Standards for wireless data communication managed by the Institute of Electrical and Electronics Engineers (IEEE). The 802.11 Standards are often referred to as "Wi-Fi®", but are referenced to herein in various ways.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Example Procedures" describes some example procedures for tethering parameters for a tethering connection in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for tethering parameters for a tethering connection. Environment 100 includes a host device 102 which can be embodied as any suitable device such as, by way of example and not limitation, a smartphone, a wearable device, a tablet computer, a portable computer (e.g., a laptop), a desktop computer, and so forth. One of a variety of different examples of the host device 102 is shown and described below in FIG. 14.

The host device 102 of FIG. 1 is illustrated as including a wireless module 104, which is representative of functionality to enable the host device 102 to communicate wirelessly with other devices and/or entities. The wireless module 104 can be configured to enable data communication via a variety of different wireless techniques and protocols. Examples of such techniques and/or protocols include cellular communications (e.g. 3G, 4G, Long Term Evolution (LTE), and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16), wireless telephone networks, and so on.

The wireless module 104, for instance, includes hardware components that can be employed to enable the client device 102 to communicate wirelessly. Examples of such wireless hardware components include radio transmitters, radio receivers, various types and/or combinations of antennas, and so on. In at least some embodiments, the client device 102 is a multi-radio device that can communicate via different wireless technologies and/or protocols.

The host device 102 further includes a tethering module 106 with a tethering profile 108. The tethering module 106 is representative of functionality to enable a tethered device 110 to wirelessly "tether" to the host device 102 such that wireless resources, such as wireless bandwidth, can be allocated to the tethered device 110 via the host device 102. The tethering module 106, for instance, enables various aspects of techniques for tethering parameters for a tethering connection to be performed.

The tethering profile 108 is representative of a collection of various types of tethering information and tethering parameters for the host device 102 and tethered devices, such as the tethered device 110. The tethering profile 108 may also track devices that are tethered to the host device 102. For example, the tethering profile 108 includes device records for devices that tether to the host device 102, e.g., the tethered device 110. Further details concerning the tethering profile 108 are discussed below with reference to FIG. 14.

The tethered device 110 is representative of a device that wirelessly connects ("tethers") to the host device 102 such that wireless resources are routed through the host device 102 to the tethered device 110. The tethered device 110, for instance, accesses a network 112 via the host device 102. The tethered device 110 can be embodied as any suitable device such as, by way of example and not limitation, a smartphone, a tablet computer, a wearable device, a portable computer (e.g., a laptop), a desktop computer, and so forth. One of a variety of different examples of the tethered device 110 is shown and described below in FIG. 14. Although a single tethered device 110 is illustrated, it is to be appreciated that implementations enable multiple devices to tether to the host device 102 such that wireless resources can be routed (e.g., simultaneously and/or concurrently) through the host device 102 to multiple different tethered devices.

The host device 102 further includes a multiplexer 114, which is representative of functionality to multiplex wireless signal for the host device 102. The multiplexer 114, for instance, enables the host device 102 to multiplex data received from the tethered device 110 with its own data such that the combined data can be wirelessly transmitted to various entities via the network 112. The multiplexer 114 may further include demultiplexing functionality to enable data received via the network 112 and intended for (e.g., addressed to) the tethered device 110 to be separated from other data and forwarded to the tethered device 110.

According to various implementations, the network 112 is representative of a single network or a combination of different interconnected networks. In at least some implementations, the network 112 includes different portions of the radio spectrum that may be leveraged for wireless communication. The network 112, for instance, represents radio spectrum in different frequency bands, such as cellular bands, ultra-high frequency (UHF), super-high frequency (SHF), and so forth. The network 112 may also represent a combination of wireless and wired networks and may be configured in a variety of ways, such as a wide area network (WAN), a local area network (LAN), the Internet, and so forth.

The tethered device 110 includes a wireless module 116, which is representative of functionality to enable tethered device 110 to communicate wirelessly with other devices and/or entities. Example attributes of the wireless module 116 are discussed above with reference to the wireless module 104.

The tethered device 110 further includes applications and services ("apps") 118, which are representative of functionalities to perform various tasks via the tethered device 110. As used herein, the term "applications" can refer to applications that are run locally and/or in a distributed environment, as well as services such as local services, web services, cloud-based services, and so forth. Examples of the apps 118 include a word processing application, a web browser, an email client, a communication service, a spreadsheet application, a content editing application, a web-based service portal, and so forth.

The apps 118, for instance, include a communication application 120. Generally, the communication application 120 is representative of functionality to enable different forms of communication via the tethered device 110. Examples of the communication application 120 include a voice communication application (e.g., a Voice over Internet Protocol (VoIP) client), a video communication application, a messaging application, a content sharing application, and combinations thereof. The communication application 120, for instance, enables different communication modalities to be combined to provide diverse communication scenarios. In at least some implementations, the communication application 120 may be implemented as an application installed on the tethered device 110, and/or as a portal to a communication service that is hosted remotely and accessible via the network 112.

The environment 100 further includes network service providers 122, which are representative of entities that provide network infrastructure and connectivity for the network 112 via different networking technologies. Examples of the network service providers 122 include cellular service providers, Internet service providers (ISPs), enterprise and/or facility network providers, and so forth. According to various implementations, the service providers 122 can provide network connectivity to the host device 102 via one or more of a variety of different wireless technologies, such as cellular (e.g., LTE, 3G, and so forth), Wi-Fi™, television white spaces, satellite, and so forth.

The environment 100 further includes a spectrum manager 124 which is representative of an entity and/or functionality that tracks information about wireless channel availability and answers queries for available wireless resources, such as queries for wireless channels for wireless data transmission. The spectrum manager 124, for instance, maintains a tethering service 126 which is representative of functionality to perform various aspects of techniques for tethering parameters for a tethering connection discussed herein. To enable various functionality of the tethering service 126, the spectrum manager 124 maintains an available channel DB 128, a user DB 130, and an applications and services ("apps") DB 132.

The available channel DB 128 tracks available wireless channels that are available for wireless communication, such as television white space availability, LTE channel availability, guard band availability, and so forth. The user DB 130 tracks information for different users, such as service levels (e.g., service subscriptions) for different users, permissions and/or privileges for different users, and so forth. The apps DB 132 tracks information for different applications and/or services, such as apps and services that may be entitled to priority access to particular channels, apps and services that may be entitled to enhanced and/or premium service levels (e.g., enhanced bandwidth and/or additional wireless channels), and so on.

In at least some implementations, the available channel DB 128 is populated at least in part with channel information obtained from a channel database service 134. The spectrum manager 124, for example, may periodically and/or dynamically query the channel database service 134 for available channels, such as available television white spaces, available cellular channels, available guard bands, and so forth. Generally, the channel database service 134 is representative of functionality to track and/or manage various attributes of wireless channels. The channel database service 134, for instance, can track channel utilization for different wireless channels, e.g., whether a particular wireless channel is in use and/or is available to be used for wireless communication, level of channel usage for different channels, and so forth.

The channel database service 134 may also track and monitor various other attributes of wireless channel, such as channel quality, signal-to-noise ratios for different channels, noise floor in particular channels, and so forth. For example, the channel database service 134 maintains a channel database 136 that stores status information for different wireless channels. As further detailed below, the channel database service 134 may provide channel information from the channel database 136 to different entities, such as the spectrum manager 124, to enable wireless channels to be selected for wireless communication.

According to various implementations, techniques discussed herein can be employed to establish wireless data communication between the host device 102 and other devices utilizing a variety of different wireless data communication techniques and/or protocols. For instance, channels that are identified in the available channel database 128 may be leveraged for wireless communication via various of the 802.11 standards. This is not intended to be limiting, however, and a wide variety of different wireless techniques and protocols may be utilized in accordance with the disclosed embodiments. Further, while certain aspects of established wireless protocols (e.g., 802.11, Wi-Fi Direct™, and so on) may be utilized in tandem with techniques discussed herein to enable wireless data communication between devices, techniques discussed herein are inventive and are not to be considered part of these protocols as they currently exist.

Figure 2:
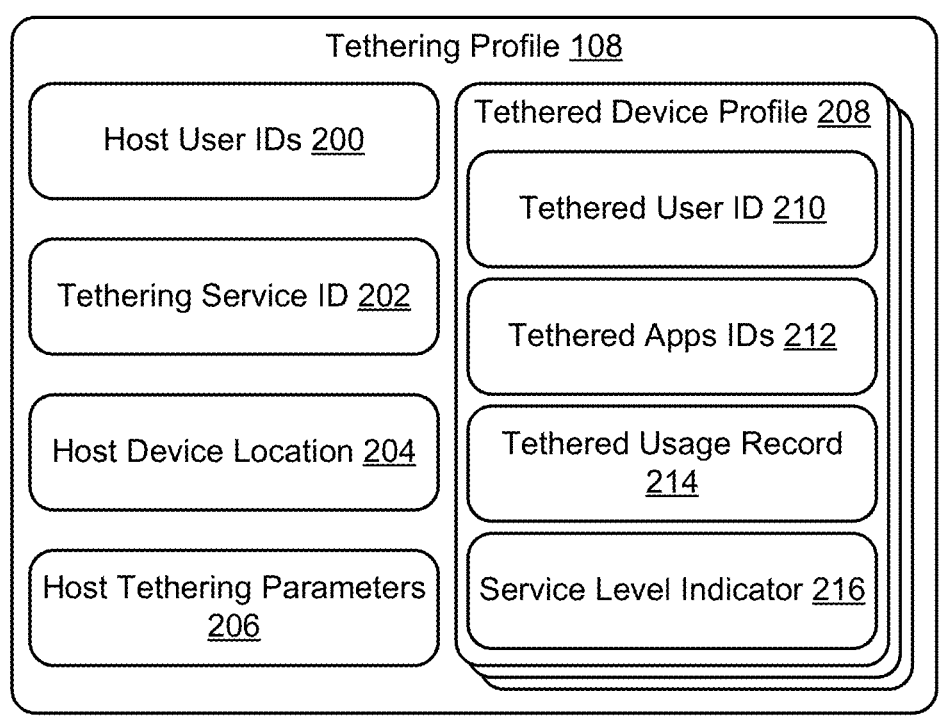
FIG. 2 illustrates an example implementation of a tethering profile in accordance with one or more implementations.

FIG. 2 illustrates an example implementation of the tethering profile 108, introduced above. In at least some implementations, individual devices that engage in tethering include their own specific tethering profile 108.

The tethering profile 108 includes host user IDs 200, which are representative of different user IDs for a host device and/or tethering user. The host user IDs 200 may include an ID for a device that currently implementing tethering, and may also include other devices registered to a user of a host device. For instance, a user of a host device may register their other devices as part of the tethering profile 108 such that their devices can be differentiated from other users' devices. In at least some implementations, this enables devices associated with a host user to be given priority access to wireless resources (e.g., wireless bandwidth) over devices associated with other tethered users.

The tethering profile 108 further includes a tethering service ID 202, a host device location 204, and tethering parameters 206. The tethering service ID 202 is representative of an identifier which can be included in a service query to identify the query as being tethering-related. The tethering service ID 202, for instance, can be recognized by the tethering service 126 such that an associated query can be processed as a tethering-related query. The host device location 204 is representative of location information that specifies a location the host device 102. The host device location 204 can be specified in various ways, such as via Global Positioning Satellite (GPS) coordinates, location with reference to a cellular network (e.g., a base station and/or base stations to which the host device 102 is connected), and so forth. The host device location 204 can be periodically and/or dynamically updated, such as on a periodic basis, in response to a change in physical location of the host device 102, and so forth.

The host tethering parameters 206 are representative of different parameters and attributes that specify how tethering with the host device 102 is to occur. The host tethering parameters 206, for instance, may include a minimum bandwidth that is to be allocated to the host device 102 and/or other devices registered to a host user. The host tethering parameters 206 may also include dynamic environment attributes, such as a current bandwidth of a connection to a host device, a current signal strength of wireless signal to a host device, battery level of a host device, and so forth.

The tethering profile 108 further includes a tethered device profile 208, which is representative of a log of information about a particular tethered device. According to various implementations, the tethering profile 108 may include multiple tethered device profiles 208 that each correspond to a different tethered device and/or tethered user profile.

The tethered device profile 208 includes tethered user identifier (ID) 210, which is representative of an identifier and/or identifiers that can be used to differentiate a particular tethered user from other users. Examples of the tethered user ID 210 include a username for a particular tethered user, a media access control address (MAC address) for a tethered user's device, an International mobile Subscriber Identity (IMSI) for a tethered device, an Internet Protocol (IP) address for a particular tethered device, and so forth.

The tethered device profile 208 further includes tethered apps IDs 212 and a tethered usage record 214. The tethered apps IDs 212 are representative of identifiers for different applications and services that are installed and/or executing on a tethered device. In at least some implementations, the tethered apps IDs 212 include an identifier for an application and/or service for which wireless bandwidth is being requested.

The tethered usage record 214 tracks statistics for tethered wireless data usage of a tethered device. The tethered usage record 214, for instance, tracks a data rate of wireless data transmission between the tethered device 110 and the host device 102. In at least some implementations, the tethered usage record 214 includes a total wireless data usage for a tethered device, such as a total volume (e.g., in bytes) of data transmitted and/or received by a tethered device. The tethered usage record 214 can track total wireless usage based on a variety of metrics, such as during a particular connectivity session, over a specified period of time (e.g., minutes, hours, days, and so forth), cumulatively for multiple devices registered to a particular tethered user, and so forth. The tethered usage record 214, for instance, may track wireless data usage by a particular tethered user over multiple connectivity sessions that may occur during a specified period of time. In at least some implementations, the tethered usage record 214 can be used to throttle wireless bandwidth to a tethered device if the device exceeds an allotted data rate and/or packet volume.

The tethered device profile 208 further includes a service level indicator 216, which identifies a service level and/or quality of service for the tethered device profile 208. In at least some embodiments, the service level indicator 216 is configurable based on service level information received from the spectrum manager 124. A tethered connection with the tethered device 110, for instance, can be managed based on a service level identified by the service level indicator 216.

According to one or more implementations, aspects of the tethering profile may be configured via user input. The tethering module 106, for instance, may present a graphical user interface (GUI) that is configured to receive user input to configure various attributes of the tethering profile 108. One example of a tethering GUI is discussed below.

Having described an example environment in which the techniques described herein may operate, consider now a discussion of some example implementation scenarios in accordance with one or more embodiments.

Example Implementation Scenarios

The following discussion describes example implementation scenarios for tethering parameters for a tethering connection in accordance with one or more embodiments. In portions of the following discussion, reference will be made to the environment 100 of FIG. 1.

Figure 3:
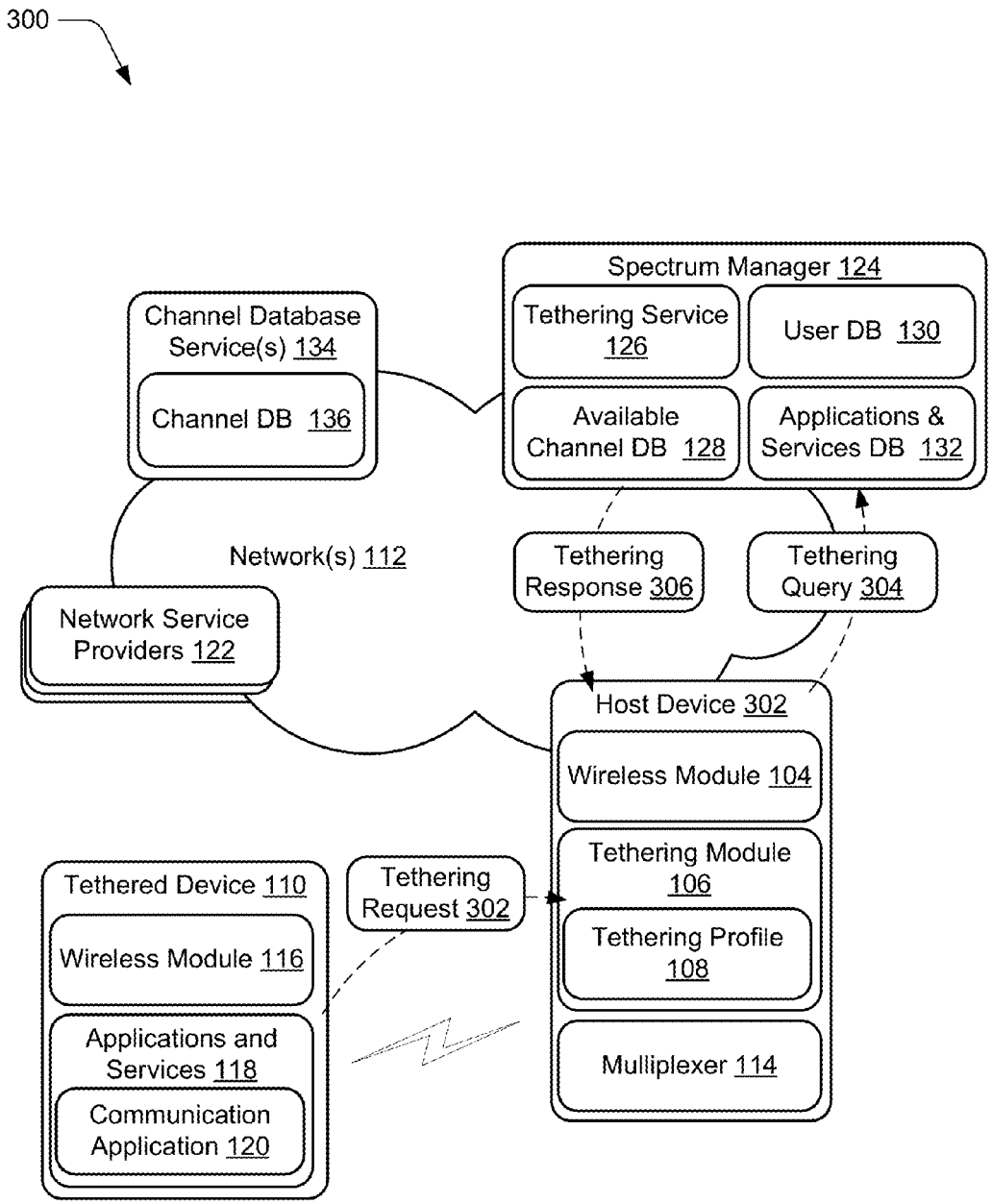
FIG. 3 illustrates an example implementation scenario for configuring a tethered connection in accordance with one or more implementations.

FIG. 3 illustrates an example implementation scenario 300 for configuring a tethered connection in accordance with one or more embodiments. In the scenario 300, the tethered device 110 wirelessly associates (e.g., "tethers") to the host device 102. As part of associating with the host device 102, the tethered device 110 communicates a tethering request 302 to the host device 102. The tethering request 302 includes various information about the tethered device 110, such as a user ID for the tethered device 110, identifiers for one or more of the apps 118, attributes (e.g., bandwidth) of a wireless connection being requested, and so forth. In at least some implementations, the tethering request 302 identifies an application and/or service for which wireless bandwidth will be used, such as the communication application 120 introduced above.

The host device 102 populates the tethered device profile 208 of the tethering profile 108 with information from the tethering request 302. Example attributes of the tethering profile 108 and the tethered device profile 208 are discussed above. The host device 102, for instance, may generate a new tethered device profile 208 for the tethered device 110, or may utilize a tethered device profile 208 that was previously generated for the tethered device 110. For example, a tethered device profile 208 may have been previously generated for the tethered device 110 during a previous tethering session, and thus may be utilized and/or updated for a current tethering session.

Further to the scenario 300, the host device 102 generates a tethering query 304 and submits the tethering query 304 to the spectrum manager 124. According to one or more implementations, the tethering query 304 includes information from the tethering profile 108, such as the tethered device profile 208 and/or other information discussed above. The tethering query 304 also includes location information, such as the host device location 204.

The spectrum manager 124 receives the tethering query 304 and parses the tethering query 304 to ascertain the various information included in the query. The spectrum manager 124, for instance, recognizes the tethering service ID 202 included in the tethering query 304 and thus ascertains that the tethering query 304 pertains to a tethering scenario.

Based on the information and attributes ascertained from the tethering query 304, the spectrum manager 124 identifies wireless channels in the available channel DB 128 that are available at the host device location 204 for wireless data communication. The spectrum manager 124, for instance, identifies wireless channels that may be utilized by the host device 102 for wireless data transmission via the network 112. The wireless channels identified may be based on wireless channels that are identified by the channel database service 134 as being available at the host device location 204 for wireless communication. Examples of different wireless channels include cellular channels, television white spaces, guard bands in the radio spectrum, unutilized cellular channels, and so forth.

The spectrum manager 124 further identifies a tethered user ID and/or tethered apps ID included in the tethering query 304. According to one or more implementations, the spectrum manager 124 may match the tethering user ID to a user profile in the user DB 130. The user profile may include various information about the tethered device 110, such as status information for the tethered device 110. For instance, the user profile may indicate that a user of the tethered device 110 has a subscription to a particular service that entitles the user to premium tethered service.

The spectrum manager 124 may also match the tethered apps ID 212 included in the query to an apps profile identified in the apps DB 132. The apps profile, for instance, may indicate various information about an application and/or service associated with the tethering query 304. For example, the apps profile may indicate operational parameters for an application, such as minimum bandwidth required for the application to execute, a preferred quality of service (QoS) for the application, types of media associated with the application (e.g., text content, audio, video, and so forth), and so on. Additionally or alternatively, the apps profile may indicate certain privileges for an application, such as that the application is entitled to preferred treatment over other applications in terms of bandwidth allocation, wireless channel allocation, and so forth.

The spectrum manager 124 selects a set of channels from the available channels identified above and based on information from the tethering query 304. For instance, the spectrum manager 124 ascertains that a user and/or application of the tethered device 110 is entitled to a certain level of service (e.g., amount of bandwidth, QoS, and so forth), and thus selects a quantity and/or quality of channels that are available to enable the host device 102 to provide the specified level of service to the tethered device 110 while enabling the host device 102 to maintain its own minimum bandwidth and/or signal quality requirements. If the spectrum manager 124 ascertains that the user and/or application of the tethered device 110 is entitled to a premium service level, the spectrum manager may select more and/or higher quality channels than would be selected for a standard (e.g., lower) service level.

The spectrum manager 124 generates a tethering response 306 that includes identifiers for the selected set of channels, such as channel numbers, carrier frequencies, frequency ranges, and so forth. The tethering response 306 may also include various other parameters pertaining to tethering between the tethered device 110 and the host device 102.

The tethering response 306, for instance, may specify bandwidth to be allocated to the tethered device 110, a QoS to be applied to data (e.g., packets) from the tethered device 110, and so forth. The tethering response 306 may specify a particular QoS level to be applied by the host device 102 to packets transmitted from the tethered device 110, such as best effort, expedited forwarding, assured forwarding, and so forth. In at least some implementations, the tethered device 110 may be a preferred user, and thus may be entitled to a higher QoS than non-preferred users that tether with the host device 102.

Continuing with the scenario 300, the spectrum manager 124 communicates the tethering response 306 to the host device 102. The host device 102 parses the tethering response 306 to ascertain various information and parameters included in the response. The host device 102, for example, ascertains wireless channels identified in the tethering response 306. The host device 102 may utilize the wireless channels for wireless data communication, such as for connectivity to the network 112.

The host device 102 also identifies from the tethering response 306 parameters that are specific to the tethered device 110, such as bandwidth allocation for the tethered device 110. In at least some implementations, the bandwidth allocation may be specified as a discrete maximum bandwidth, such as 1 Megabit per second (Mbps), 2 Mbps, N Mbps, and so forth. Alternatively or additionally, the bandwidth allocation may be specified as a percentage of total bandwidth available to the host device 102, such as 15%, 25%, N %, and so forth. In yet another example implementation, bandwidth allocation to the tethered device 110 may be specified as a combination of factors, such as a maximum bandwidth that does not exceed a certain percentage of total, and so forth. Thus, bandwidth may be allocated for tethering in a variety of ways.

The tethering response 306 may also specify application-specific parameters for tethering. For instance, the tethering response 306 may identify apps 118 that are to be given priority for purposes of tethering. A particular app 118, for example, may be permitted a certain amount and/or percentage of bandwidth, such as with reference to a total amount of bandwidth allocated to the tethered device 110. In at least some implementations, a high-priority application may be entitled to exceed an amount of bandwidth allocated to the tethered device 110, such as by a discrete amount and/or a specified percentage.

As referenced above, the tethering response may also include a QoS level to be applied to data from a particular application. For instance, data transmitted from some of the apps 118 may be processed according to a particular QoS level (e.g., best effort), whereas data from a priority application (e.g., the communication application 120) may be processed according to a higher QoS, e.g., expedited forwarding.

Thus, different apps 118 identified in the tethering response 306 may be associated with different operational parameters that specify how data from the different applications is to be processed and/or prioritized by the host device 102 and/or other entity.

Continuing with the scenario 300, the host device 102 applies various parameters specified by the tethering response 306 to data transmitted from the tethered device 110. According to various implementations, the tethering module 106 stores information from the tethering response 306 as part of the tethered device profile 208 for the tethered device 110. Thus, information from the tethered device profile 208 may be used to control attributes of tethering between the tethered device 110 and the host device 102.

In at least some implementations, the tethered device profile 208 may be updated, such as dynamically based on changes in device attributes, user attributes, channel attributes, and so forth. The tethered device profile 208, for instance, may be dynamically updated during an ongoing tethering session between the tethered device 110 and the host device 102. Thus, implementations may enable attributes of a tethering session to be dynamically reconfigured (e.g., during an ongoing tethering session), such as bandwidth allocation, application priority, QoS levels, and so forth.

While the scenario 300 is discussed with reference to a single tethered device 110, it is to be appreciated that implementations discussed herein may be employed to tether multiple devices to a host device 102. In an example implementation, multiple tethered devices may tether to the host device 102 as part of multiple concurrent and distinct tethered connections to the host device 102. For instance, each device of multiple devices may be associated with its own respective tethered device profile 208 that specifies various tethering parameters for the respective devices. In at least some implementations, a particular tethered device may be entitled to a higher tethering service level than another tethered device, and thus may be allocated more tethering resources (e.g., bandwidth, data volume, QoS, and so forth) than the other tethered device(s). Thus, implementations may be employed to individually manage tethering connections between tethered devices and a host device such that each connection can be individually configured and/or customized in various ways.

Figure 4:
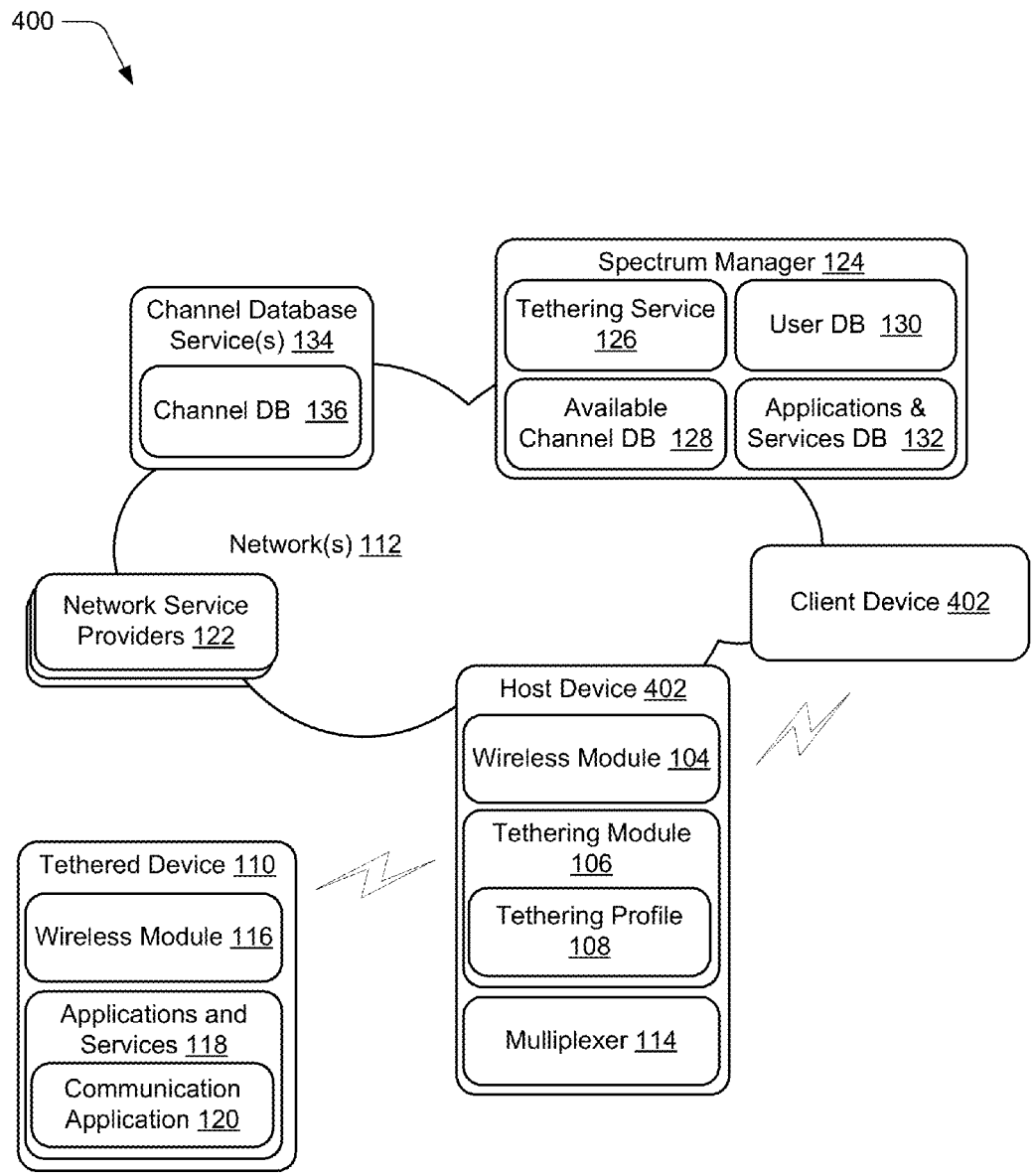
FIG. 4 illustrates an example implementation scenario for supplementing wireless resources of a host device in accordance with one or more implementations.

FIG. 4 illustrates an example implementation scenario 400 for supplementing wireless resources of a host device in accordance with one or more embodiments. The scenario 400, for example, represents a variation and/or extension of the scenario 300 discussed above.

In the scenario 400, the tethered device 110 is tethered to the host device 102, such as discussed above. The scenario 400 also includes a client device 402 which is connected to the network 112. In at least some implementations, the host device 102, the tethered device 110, and the client device 402 may be in close proximity to each other, such as in a conference room, a classroom, an enterprise facility, and so forth.

Further to the scenario 400, the host device 102 detects that the client device 402 has network connectivity and has available wireless bandwidth. The client device 402, for instance, may not be in use and/or may not be utilizing its wireless connection. Accordingly, the host device 102 wirelessly associates with the client device 402 to establish a wireless connection between the host device 102 and the client device 402. The connection between the host device 102 and the client device 402 may be implemented via Wi-Fi™ (e.g., Wi-Fi Direct), Bluetooth, and/or other suitable wireless connection technology.

According to various implementations, the wireless connection between the host device 102 and the client device 402 provides the host device 102 with additional bandwidth that can be used to serve other devices, such as the tethered device 110. For instance, the host device 102 may utilize the wireless connection of the client device 402 to the network 112 to transmit and receive data, in addition to its own wireless connection to the network 112. This additional bandwidth may be utilized to increase a level of service that is provided to the tethered device 110, such as by providing a faster connection, increasing a data volume allocated to the tethered device 110, and so forth.

In at least some implementations, the tethered device profile 208 can be updated in response to the connection between the host device 102 and the client device 402 being established. For instance, a bandwidth allocation, data volume allocation, and/or QoS designation for the tethered device 110 may be upgraded (e.g., increased) to provide an increased level of service to the tethered device 110.

According to one or more implementations, availability of an increased level of service can be communicated to the tethered device 110. For instance, the spectrum manager 124 can receive a notification from the host device 102 (e.g., via the tethering module 106) that increased wireless resources are available. In response, the spectrum manager 124 can communicate an upgrade query to the tethered device 110 via its tethered connection to the host device 102. The upgrade query can include a GUI that queries a user of the tethered device 110 as to whether the user desires to upgrade their tethered wireless connection. The upgrade query, for example, may offer an increased level of service for a fee. If the user accepts the offer of an upgrade, the service level of the tethered connection between the tethered device 110 and the host device 102 can be increased. The increased service level, for instance, can provide increased bandwidth, increased data volume, higher QoS, and/or other increase in service level to the tethered device 110. In at least some implementations, the upgrade query to the tethered device 110 may be invisible to the host device 102 such that the host device 102 is not aware of the upgrade query.

Figure 5:
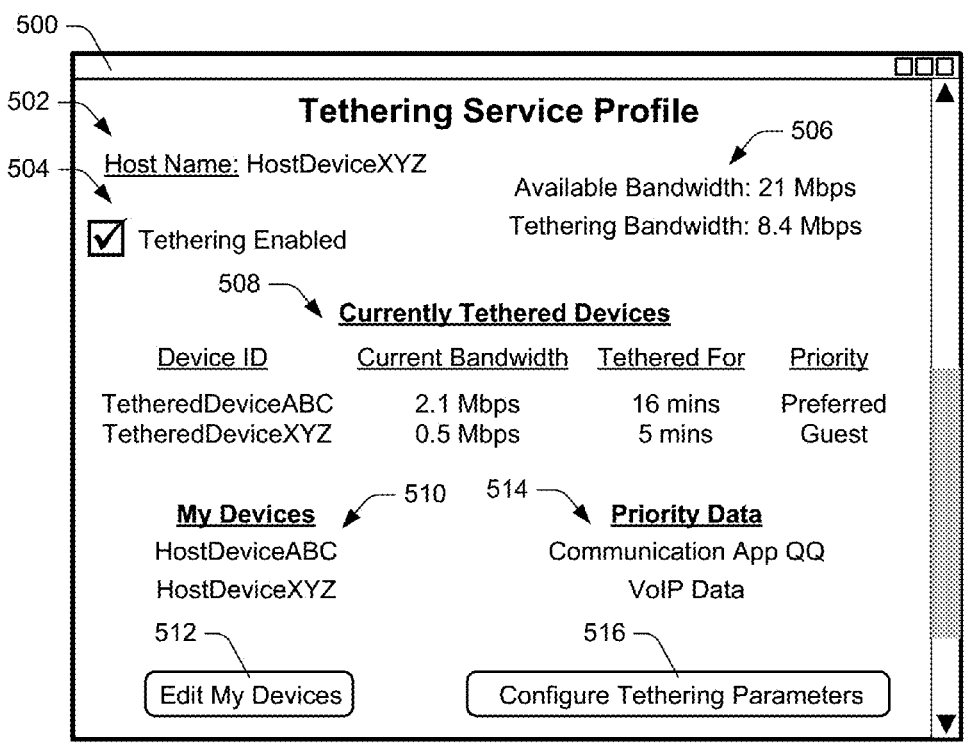
FIG. 5 illustrates an example tethering profile graphical user interface in accordance with one or more implementations.

FIG. 5 illustrates an example tethering profile GUI 500 in accordance with one or more implementations. Generally, the GUI 500 enables various tethering attributes to be configured and presents status information for various tethering conditions. The GUI 500, for instance, enables the tethering profile 108 to be configured and displays information from the tethering profile 108.

The GUI 500 includes a host ID 502, which identifies a device that is tethering-enabled, e.g., that may host tethered devices. The host ID 502, for instance, may correspond to a host name that is presented to proximity devices as an available tethering host. In at least some implementations, the host ID 502 is customizable such that a user can specify a particular host name.

The GUI 500 further includes a tethering status field 504, which indicates whether tethering functionality of the host device is currently enabled. The tethering status field 504 includes a check box that is selectable to disable and enable tethering to the host device. In this particular example, the tethering status field 504 indicates that tethering to the host device is currently enabled.

A bandwidth allocation region 506 indicates various bandwidth status for the host device. The bandwidth allocation region 506, for instance, indicates a total available bandwidth that is available to the host device for wireless data transmission, as well as a tethering bandwidth that corresponds to an amount of bandwidth that is allocated for serving tethered devices. In at least some implementations, bandwidth allocated for tethering may be allocated based on a percentage of total available bandwidth, based on a preset maximum total bandwidth, and/or other way of allocating bandwidth for tethering services.

The bandwidth amounts specified in the bandwidth allocation region 506 may be dynamic and may change based on various factors, such as changes in bandwidth available to a host device, changes in tethered devices, changes in application status, and so forth. For instance, if a priority device tethers to the host device, the tethering bandwidth amount may be increased, e.g., relative to the total available bandwidth.

The GUI 500 further includes a tethered device region 508, which specifies various information about tethered devices. For instance, a device ID column identifies devices that are currently tethered to the host device, and/or devices that are requesting a tethered connection to the host device. In at least some implementations, a device ID may correspond to an actual user and/or device ID that may be used to differentiate a particular tethered device from other devices.

Alternatively, a device ID may be anonymous such that an anonymous device entry is specified that indicates that a device is connected but does not identify the specific device. For instance, privacy settings for the tethering profile 108 may be set to allow a tethered device to specify an anonymous tethering ID. In such a scenario, during establishment of a tethered connection to a host device, a tethered device may be given an option to select an anonymous ID for tethering purposes.

In at least some implementations, a host device user may specify that anonymous device IDs are not permitted. For instance, a host user may wish to remain aware of who and/or what is tethered to their device. In a scenario where an anonymous tethering ID is not permitted, an option to select an anonymous ID may not be presented. In such a scenario, a device that requests to tether to a host device may be notified that their ID will be visible to the host device. For instance, a notification GUI may be presented to the requesting device indicating that when a tethered connection to a host device is established, an identifier for the requesting device will be visible to a user of the host device. If a requesting user wishes to remain anonymous, the user may opt not to tether to the host device.

The tethered device region 508 further includes a current bandwidth column that indicates bandwidth allocation and/or usage to the respective tethered devices. A "tethered for" column indicates a length of time of a current tethering session for the respective tethered devices. A priority column indicates priority status and/or service level for the respective tethered devices. For instance, the "TetheredDeviceABC" is a preferred (e.g., high priority) user and thus is entitled to an increased level of wireless service as compared to a guest user, e.g., the "TetheredDeviceXYZ." As explained elsewhere herein, certain users may be considered priority users that are entitled to enhanced service levels. Priority may be based on one or more factors, such as subscription to a particular service, a particular type and/or instance of an application on a user's device, a user having purchased the right to an enhanced service level, and so forth.

The GUI 500 further includes a "My Devices" region 510 that identifies devices that are registered to and/or associated with the tethering host. As discussed herein, devices that are registered to a host user may be entitled to priority access to wireless resources. For instance, total available wireless resources (e.g., bandwidth) may be divided into a portion that is allocated to a host device, and a portion that is allocated to tethered devices. In at least some implementations, devices that are registered to a host user may be entitled to utilize a portion of tethering resources that are allocated to the host device. In this particular example, the My Devices region 510 identifies devices including "HostDeviceABC" and "HostDeviceXYZ." As indicated in the host ID 502, the HostDeviceXYZ is currently the tethering host device. In at least some implementations, if the HostDeviceABC tethers to the HostDeviceXYZ, the HostDeviceABC will be identified in the tethered device region 508.

Presented below the My Devices region 510 is an edit devices control 512, which is selectable to present a devices GUI that enables a host user to register new devices to the host user (e.g., new "My Devices"), remove (e.g., unregister) existing devices, edit existing device attributes, and so forth.

The GUI 500 also includes a priority data region 514 and a tethering parameters control 516. According to various implementations, the priority data region 514 identities data types that are entitled to enhanced service levels over other data types. In this particular example, the priority data region 514 identifies the communication application 120, as well as VoIP data. Thus, data from the communication application 120 and VoIP data that are received from tethered devices are entitled to an enhanced service level over other types of data. As referenced above, for instance, data from the communication application 120 and VoIP data may be entitled to exceed bandwidth and/or data volume caps specified for general tethered devices.

The tethering parameters control 516 is selectable to present a parameters configuration GUI that enables various tethering parameters to be configured. Examples of such tethering parameters include bandwidth allocations for host and tethered devices, applications and data types that are entitled to priority service levels, power management parameters, and so forth.

With regard to power management, tethering parameters (e.g., resource allocation) may be affected by changes in power status, such as battery level. For instance, if a battery level on a host device falls below a certain threshold charge level (e.g., 20% of full charge), a tethering-related action may occur in response. As one example, bandwidth to tethered devices may be throttled to conserve host device battery. A timer may also be initiated for tethered connections such that at expiration of the timer, tethered connections are terminated. In at least some implementations, a notification may be sent to tethered devices indicating that host battery is low and that their respective tethered connections will be terminated, such as after a specified period of time.

Figure 6:
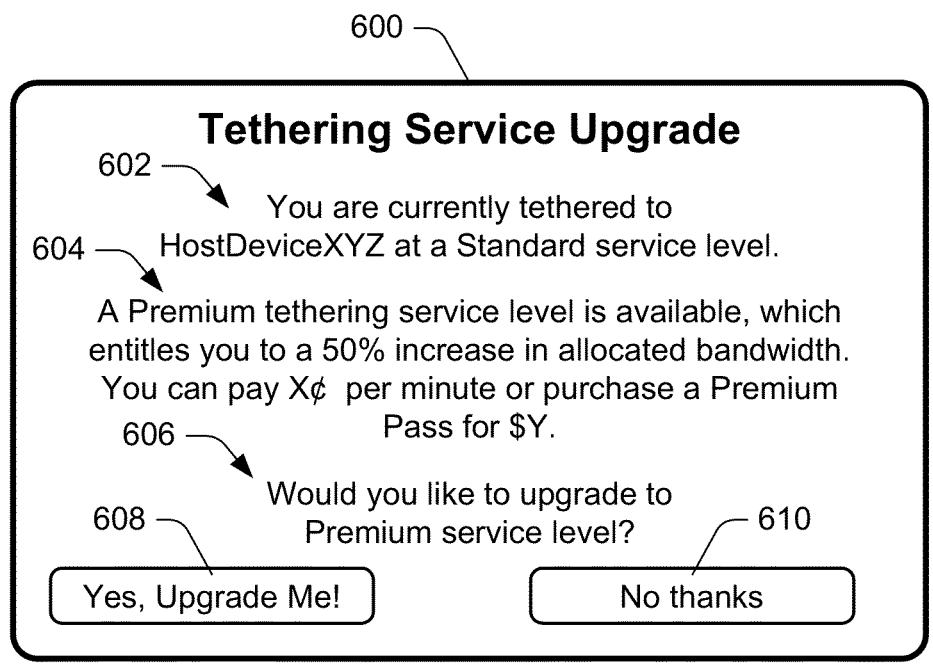
FIG. 6 illustrates an example service level graphical user interface in accordance with one or more implementations.

FIG. 6 illustrates an example service level GUI 600 in accordance with one or more implementations. Generally, the GUI 600 may be presented to a user to enable a user to choose an enhanced (e.g., priority) tethering service level. The GUI 600, for example, may be presented prior to a tethering session and/or while a tethering session is in progress. For instance, a tethered device may connect to a host device according to a particular tethered service level. After the connection is established, the GUI 600 may be presented on the tethered device to enable a user of the tethered device to upgrade the tethered service level while a tethering session is in progress, e.g., to a priority and/or enhanced service level.

The GUI 600 includes a tethered status field 602, which indicates a tethered status of a tethered device. In this particular example, the tethered status field 602 indicates that the tethered device is tethered to HostDeviceXYZ at a standard service level. In at least some implementations, a standard service level is associated with certain tethering resource caps, such as a cap on available bandwidth, a cap on total data volume (e.g., over a particular period of time), and so forth.

The GUI 600 further includes an upgrade notification 604, which includes a visual indication that a tethering service level upgrade is available that entitles the tethered device to an increased allocation of wireless resources for a fee. An upgrade query 606 asks whether the user desires to upgrade to the premium service level.

Further to the upgrade query 606, the GUI 600 includes an accept control 608 and a decline control 610. According to various implementations, the accept control 608 is selectable to present a premium service GUI which enables a user to purchase and/or configure a premium service level tethering connection. The premium service GUI, for instance, may be configured to accept payment information and/or other user information that enables the tethered user to be charged for the premium service level. On successful completion of the service level upgrade, the user's tethering connection may be upgraded to the premium service level.

The decline control 610 is selectable to decline the offer for the premium service level upgrade. For instance, selecting the decline control 610 may cause the GUI 600 to be removed from display, and for the tethered connection to continue at the standard service level.

According to one or more implementations, the GUI 600 may be communicated to the tethered device 110 by the tethering module 106, the spectrum manager 124, and/or other entity that manages and/or brokers service levels for tethered connections.

The various visual aspects and controls of the GUIs 500 and 600 are presented for purpose of example only, and it is to be appreciated that different configurations, implementations, and visual arrangements of the GUIs may be utilized in accordance with implementations discussed herein.

Having discussed some example implementation scenarios, consider now some example procedures in accordance with one or more embodiments.

Example Procedures

Figure 7:
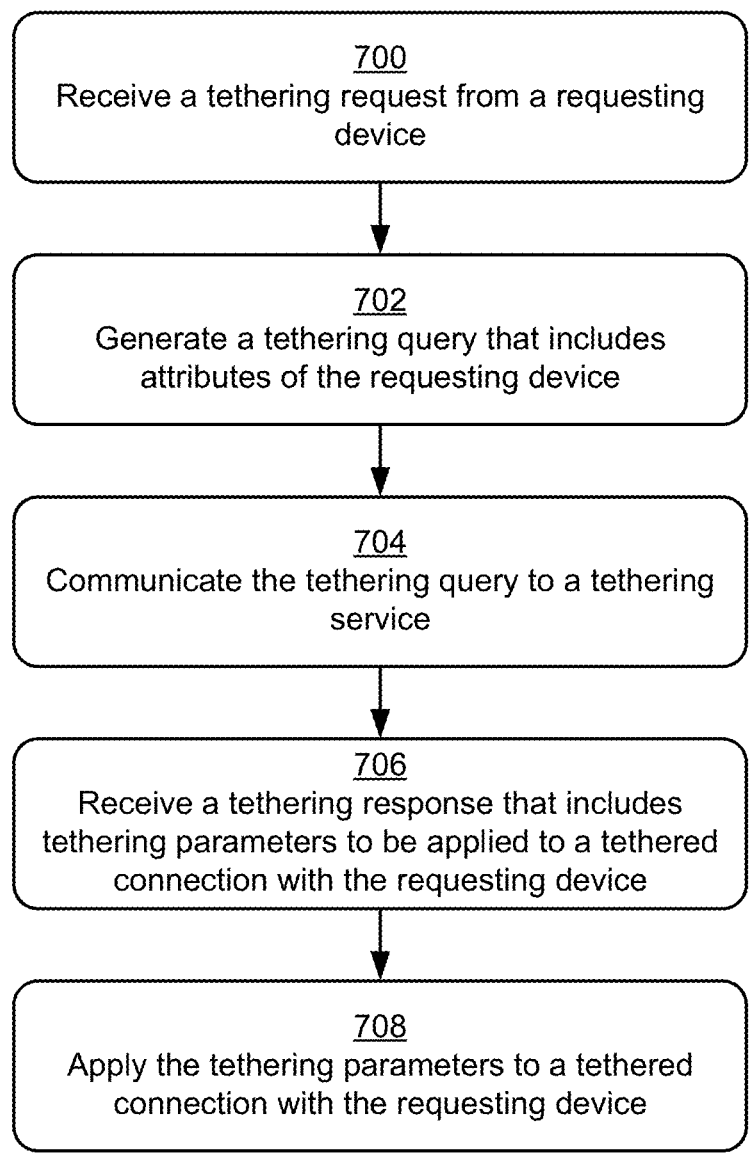
FIG. 7 is a flow diagram that describes steps in a method for determining parameters for a tethering connection in accordance with one or more implementations.

FIG. 7 is a flow diagram that describes steps in a method for determining parameters for a tethering connection in accordance with one or more implementations. In at least some implementations, the method can be performed by a tethering host, such as the host device 102.

Step 700 receives a tethering request from a requesting device. The host device 102, for instance, receives the tethering request 302 from the tethered device 110. As detailed above, the tethering request can include various attributes of a requesting device, such as a user ID for the device, IDs for applications of the device, device type of the requesting device, bandwidth parameters for the request (e.g., a minimum requested bandwidth), and so forth.

Step 702 generates a tethering query that includes attributes of the requesting device. Example attributes of the requesting device are discussed above. According to various implementations, the tethering query may also include attributes of a host device, such as a host device ID, a tethering service ID, a host device location, various tethering parameters for the host device, and so forth.

Step 704 communicates the tethering query to a tethering service. For example, the host device 102 communicates the tethering query 304 to the tethering service 126 of the spectrum manager 124.

Step 706 receives a tethering response that includes tethering parameters to be applied to a tethered connection with the requesting device. The host device 102, for instance, receives the tethering response 306 from the spectrum manager 124. Examples of different tethering parameters are discussed above, and include wireless channels that may be used by the host device to communicate with a network. Other examples of tethering parameters include bandwidth to be allocated for tethering, service levels to be applied to data from particular tethered devices, QoS markings to be applied to data from particular tethered devices and/or tethered applications, and so forth.

Step 708 applies the tethering parameters to a tethered connection with the requesting device. The host device 102, for instance, utilizes wireless channels identified in the tethering response for wireless data communication. In at least some implementations, the host device 102 can create and/or update a tethered device profile 208 for the requesting device with the tethering parameters. The host device 102 can utilize the various parameters to control attributes of a tethering connection with the tethered device 110, such as to control bandwidth and data volume allocated to the tethered device 110 and/or apps 118, to specify QoS for data from the tethered device 110, to prioritize data from the tethered device 110, and so forth.

The method described above can be performed in various ways. For instance, a tethering connection can be established with a requesting device prior to receiving a tethering response and/or prior to applying tethering parameters to the tethering connection. The host device 102, for instance, can establish a tethering connection with the tethered device 110 according to default tethering settings, such as a default (e.g., standard) service level. After the tethering response 306 is received, attributes of the tethering connection can be updated based on parameters specified in the tethering response 306. For instance, parameters specified in the tethering response 306 can override default tethering settings that were applied to the tethering connection. Thus, at least some implementations enable a tethering connection to be established between a tethering device and a host device without waiting for session-specific parameters to be received from a tethering service.

In an alternative implementation, a tethering request from a requesting device can be placed in a queue until a tethering response is received, at which point a tethering connection can be established with the requesting device based on parameters specified in the tethering response.

Figure 8:
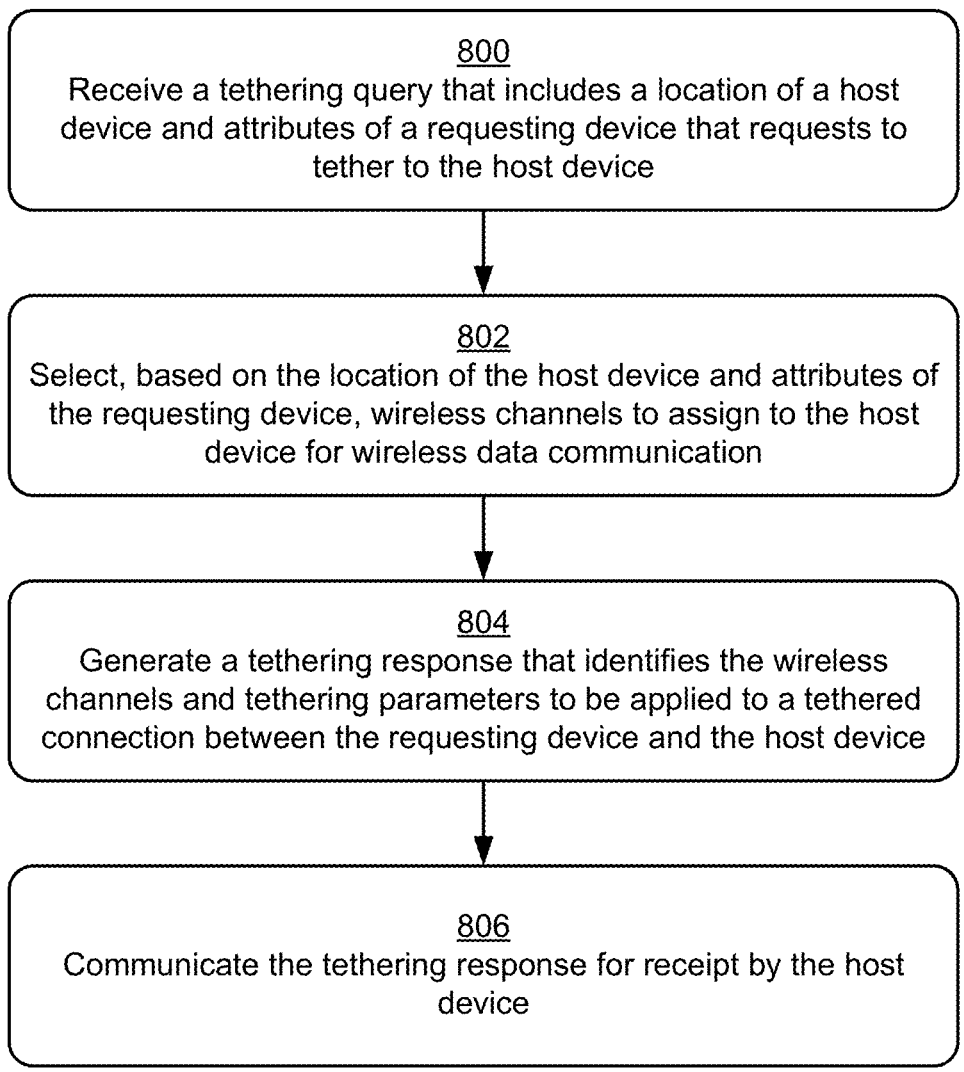
FIG. 8 is a flow diagram that describes steps in a method for providing tethering parameters in accordance with one or more implementations.

FIG. 8 is a flow diagram that describes steps in a method for providing tethering parameters in accordance with one or more implementations. In at least some implementations, the method can be performed by a tethering service, such as implemented by the spectrum manager 124.

Step 800 receives a tethering query that includes a location of a host device and attributes of a requesting device that requests to tether to the host device. The spectrum manager 124, for instance, receives the tethering query 304 from the host device 102. Various attributes of an example tethering query are discussed above.

Step 802 selects, based on the location of the host device and attributes of the requesting device, wireless channels to assign to the host device for wireless data communication. The spectrum manager 124, for example, selects a channel or subset of channels from a set of available channels identified as being available at the location of the host device in the available channel database 128.

In at least some implementations, the spectrum manager 124 receives information from the channel database service 134 that identifies a set of available wireless channels at the location of the host device. The spectrum manager 124 updates its available channel DB 128 with the set of available channels. The spectrum manager 124, for example, can periodically query the channel database service 134 for available channels, such as once an hour, once a day, and so forth. Thus, the spectrum manager 124 may periodically update the available channel DB 128.

Alternatively or additionally, the spectrum manager 124 can dynamically query the channel database service 134 for available wireless channels, such as in response to receiving the tethering query 304. Thus, in at least some implementations, the spectrum manager 124 may periodically update the available channel DB 128, and/or may dynamically update the available channel DB 128, such as in response to various events.

According to various implementations, the spectrum manager 124 selects wireless channels for the host device 102 to provide the host device 102 with sufficient wireless resources to maintain its own wireless performance quality (e.g., bandwidth, signal quality, signal strength, and so forth) while providing a tethered device and/or group of tethered devices with a tethered wireless connection at a specified service level. An example implementation for selecting wireless channels for a host device is discussed below.

Step 804 generates a tethering response that identifies the wireless channels and tethering parameters to be applied to a tethered connection between the requesting device and the host device. Examples of such parameters include a minimum and/or maximum tethering bandwidth to be allotted to the requesting device, a QoS level to be applied to data from the requesting device, data priorities for different types of data from the requesting device, and so forth. In at least some implementations, the tethering parameters may include application-specific parameters, such as bandwidth, QoS, and so forth, to be applied to data from a particular application and/or type of application.

Step 806 communicates the tethering response for receipt by the host device. The spectrum manager 124, for instance, communicates the tethering response 306 to the host device 102.

Figure 9:
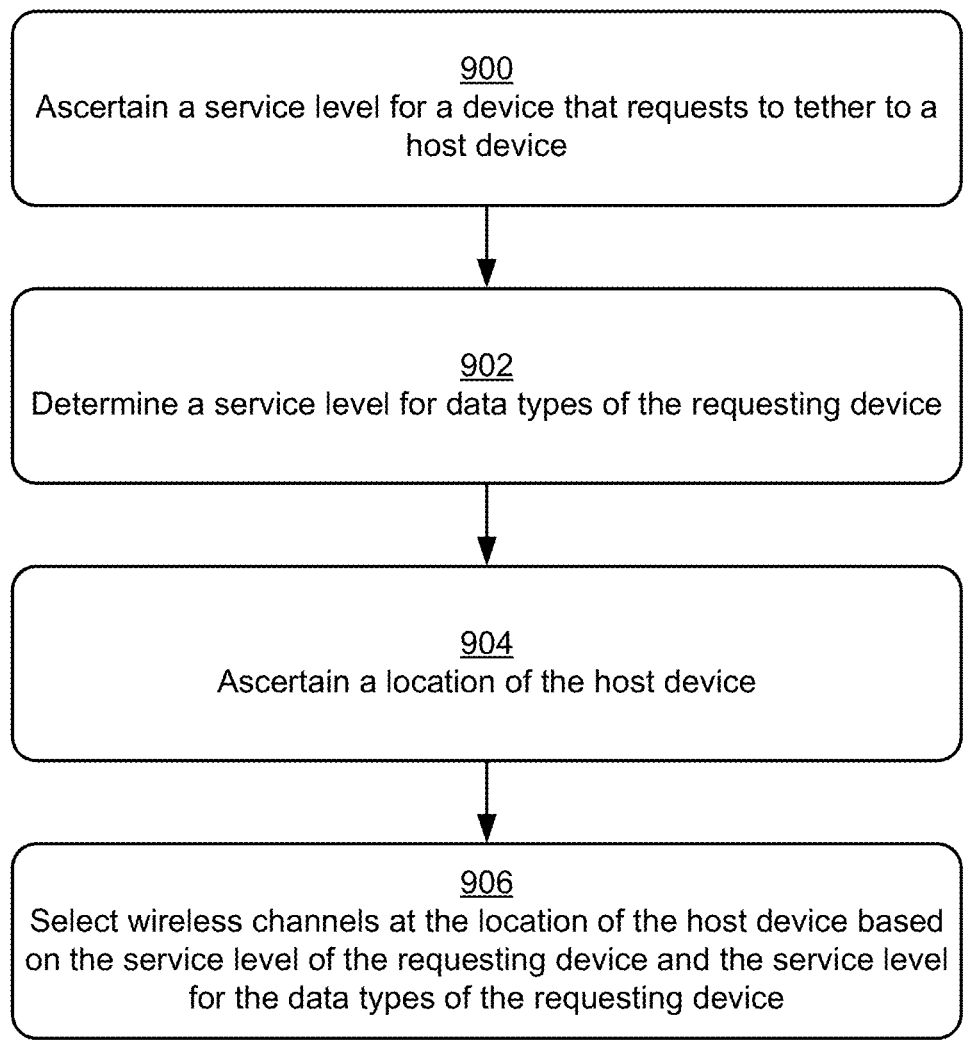
FIG. 9 is a flow diagram that describes steps in a method for selecting wireless channels for a host device in accordance with one or more implementations.

FIG. 9 is a flow diagram that describes steps in a method for selecting wireless channels for a host device in accordance with one or more implementations. In at least some implementations, the method can be performed by a tethering service, such as implemented by the spectrum manager 124. The method, for instance, describes a detailed example of step 802 of the method described above with reference to FIG. 8.

Step 900 ascertains a service level for a device that requests to tether to a host device. The spectrum manager 124, for example, ascertains whether a user of the requesting device is entitled to a default service level (e.g., a standard service level), or whether the user is a premium user that is entitled to a premium (e.g., preferred) service level. In at least some implementations, the spectrum manager 124 matches a user ID included in the tethering query 304 to a user ID for a user profile (e.g., a tethered device profile 208) in the user DB 130 to identify a matching user profile. The matching user profile, for instance, may indicate a service level for the requesting device. If no service level is identified, a default service level may be applied.

Step 902 determines a service level for data types of the requesting device. "Data type," for instance, may refer to data of a particular category, such as voice-related data (e.g., VoIP data), video data, email data, and so forth. Additionally or alternatively, data type may refer to data from a specific application. As detailed above, different types of data may be entitled to different service levels. For instance, one type of data (e.g., email-related data) may be entitled to a default service level, whereas another type of data may be entitled to a higher service level (e.g., a premium service level), such as for VoIP data and/or other real-time communication data.

Step 904 ascertains a location of the host device. For example, information identifying the location of the host device can be included in the tethering query 304.

Step 906 selects wireless channels at the location of the host device based on the service level of the requesting device and the service level for the data types of the requesting device. The spectrum manager 124, for instance, selects a number and/or quality of wireless channels that are sufficient to provide wireless bandwidth and/or quality that correlates to the service levels of the requesting data and/or the specified data types. For example, a premium tethered user may be entitled to more bandwidth than a guest tethered user, and thus more channels and/or higher quality channels may be allocated to a host device for the premium tethered user than are allocated to a host device for the guest tethered user.

According to various implementations, wireless channels are selected to not only provide a particular level of service to a tethering device, but to enable a host device to maintain a particular level of wireless service. For instance, a host device may specify a minimum threshold performance for the host device that is to be enforced during a tethering session. The minimum threshold performance, for example, may be specified in terms of minimum bandwidth, minimum signal strength, minimum signal quality (e.g., signal-to-noise ratio), and so forth. For instance, the minimum threshold performance may be defined via a tethering profile for a host device, as discussed above. Thus, the spectrum manager 124 may select channels based on level of service for a tethered device and level of service for a host device.

In at least some implementations, the available channel DB 128 maintained by the spectrum manager 124 arranges wireless channels based on location, quality, capacity (e.g., bandwidth capacity), frequency (e.g., carrier frequency), and/or other wireless channel attributes. Thus, the spectrum manager 124 can identify channels in the available channel DB 128 that are available in a particular region and that can provide a particular level of wireless service to a host device and thus to a tethered device.

As detailed above, the selected wireless channels are communicated to the host device to enable the host device to utilize the wireless channels for wireless communication.

Figure 10:
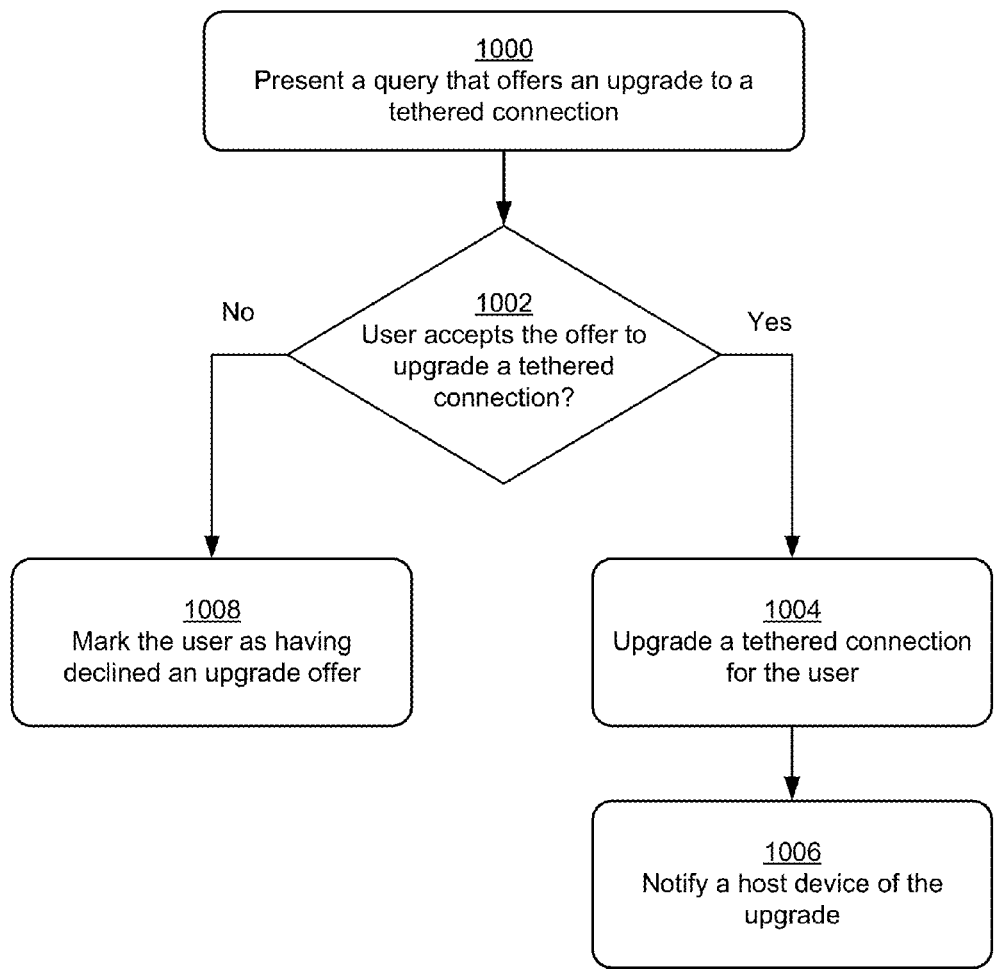
FIG. 10 is a flow diagram that describes steps in a method for offering a tethering upgrade in accordance with one or more implementations.

FIG. 10 is a flow diagram that describes steps in a method for offering a tethering upgrade in accordance with one or more implementations. In at least some implementations, the method can be performed by a tethering service, such as implemented by the spectrum manager 124. Alternatively or additionally, the method can be performed by a host device, such as the host device 102.

Step 1000 presents a query that offers an upgrade to a tethered connection. For example, the spectrum manager 124 communicates a query to the tethered device 110 that includes an offer to upgrade a tethered connection between the tethered device 110 and the host device 102. The query, for instance, includes a GUI that displays information about the query, such as the GUI 600 discussed above with reference to FIG. 6.

In at least some implementations, the query is communicated to the tethered device 110 via its tethered connection to the host device 102. For instance, the query may be communicated to the tethered device 110 after a tethered connection is established with the host device 102.

Alternatively, the query can be communicated separately from a tethered connection to the host device 102. The query, for example, may be communicated outside of a tethering scenario, such as to a user that is identified as possibly engaging in tethering at a future time. A user, for instance, may receive an email, a pop-up ad, a text message, and/or other notification that includes the query. For example, the query may offer the user an opportunity to upgrade future tethered connections for devices registered to the user, such as by subscribing to a premium tethering service.

Step 1002 ascertains whether the user accepts the offer to upgrade a tethered connection. The user, for instance, may select a control and/or other selectable indicium that indicates acceptance or refusal of the offer.

If the user accepts the offer to upgrade ("Yes"), step 1004 upgrades a tethered connection for the user. Details concerning upgrade of a tethered connection are presented above, and may generally include increased tethered bandwidth, increased data volume, increased QoS, and so forth. As detailed above, acceptance of an upgrade to a tethered connection may include user payment in exchange for the upgrade.

In at least some embodiments, an existing tethered connection is upgraded, such as in real-time in response to the user acceptance of the offer. Alternatively or additionally, the user may be registered as a premium tethering user. For example, a user profile in the user DB 130 of the tethering service 126 can be created or updated to indicate that the user is a premium tethering user. Thus, future tethering connections may be established at and/or upgraded to a premium service level by matching a user ID to a user profile that indicates the service upgrade.

Step 1006 notifies a host device of the upgrade. For instance, the spectrum manager 124 communicates an upgrade notification to the host device indicating that the tethered device 110 has upgraded its tethered connection and is entitled to an increased tethering service level. The upgrade notification, for example, can specify an increased bandwidth to be allocated to the host device 102. In at least some implementations, the upgrade notification can identify additional wireless channels that the host device 102 may utilize for wireless communication to enable the host device 102 to accommodate the upgrade.

If the user does not accept the offer to upgrade ("No"), step 1008 marks the user as having declined an upgrade offer. If the user is engaged in an ongoing tethering session when the offer is declined, the session may continue at a current service level, e.g., a standard service level. Alternatively or additionally, the user may be marked as a standard service level user, such as in a user profile for the user. Thus, future tethering sessions may be established and/or conducted based on a standard service level, e.g., at a lower than premium service level. In at least some implementations, a user that declines a tethering upgrade may be queried again at a future time with a further opportunity to upgrade their tethering service.

Figure 11:
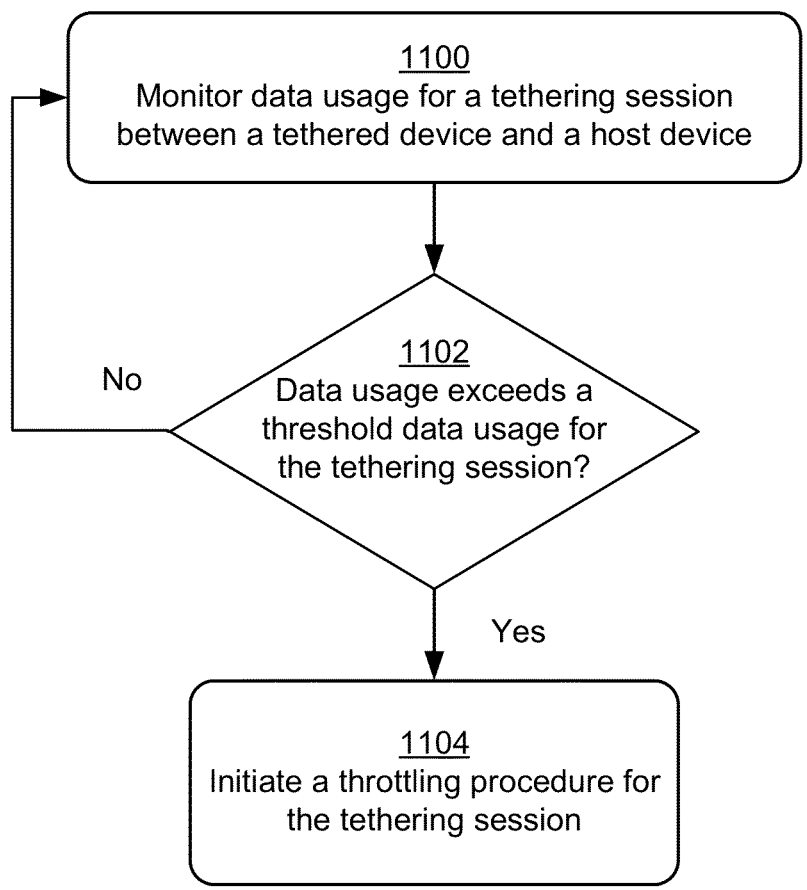
FIG. 11 is a flow diagram that describes steps in a method for monitoring a tethering resource in accordance with one or more implementations.

FIG. 11 is a flow diagram that describes steps in a method for monitoring a tethering resource in accordance with one or more implementations. In at least some implementations, the method can be performed by a host device and/or a tethering service.

Step 1100 monitors data usage for a tethering session between a tethered device and a host device. The host device 102, for instance, monitors usage attributes of a connection of the tethered device 110 to the host device 102. Examples of such usage attributes include bandwidth between the tethered device and the host device, data volume of data transmitted and/or received by the tethered device, types of data transmitted and/or received by the tethered device, and so forth.

Step 1102 ascertains whether the data usage exceeds a threshold data usage for the tethering session. The threshold data usage, for instance, may be defined based on attributes of the tethered device, such as whether a user of the tethered device is a standard user, a premium user, and so forth. A premium user, for instance, may be entitled to a higher data usage threshold than a standard user.

Alternatively or additionally, the threshold data usage may be defined based on a data type and/or application type that is transmitted and/or received by the tethered device. Some applications and/or data types (e.g., priority applications and/or priority data types), for instance, may be entitled to a higher threshold data usage than other applications and/or data types.

If the data usage does not exceed the threshold data usage ("No"), the method returns to step 1100. If the data usage exceeds the threshold data usage ("Yes"), step 1104 initiates a throttling procedure for the tethering session. The host device 102, for instance, may reduce the bandwidth allocated to the tethered device 110 such that the data rate of data passed to and/or from the tethered device 110 through the host device 102 is reduced.

In at least some implementations, the tethered device 110 may be notified that its tethering connection is approaching a usage limit and/or has exceeded a usage limit, and that its tethering performance will be throttled. The tethered device 110 may additionally or alternatively be given an opportunity to upgrade its service level such that the usage threshold allotted to the tethered device may be increased. Example ways of offering a service level upgrade are discussed above.

Figure 12:
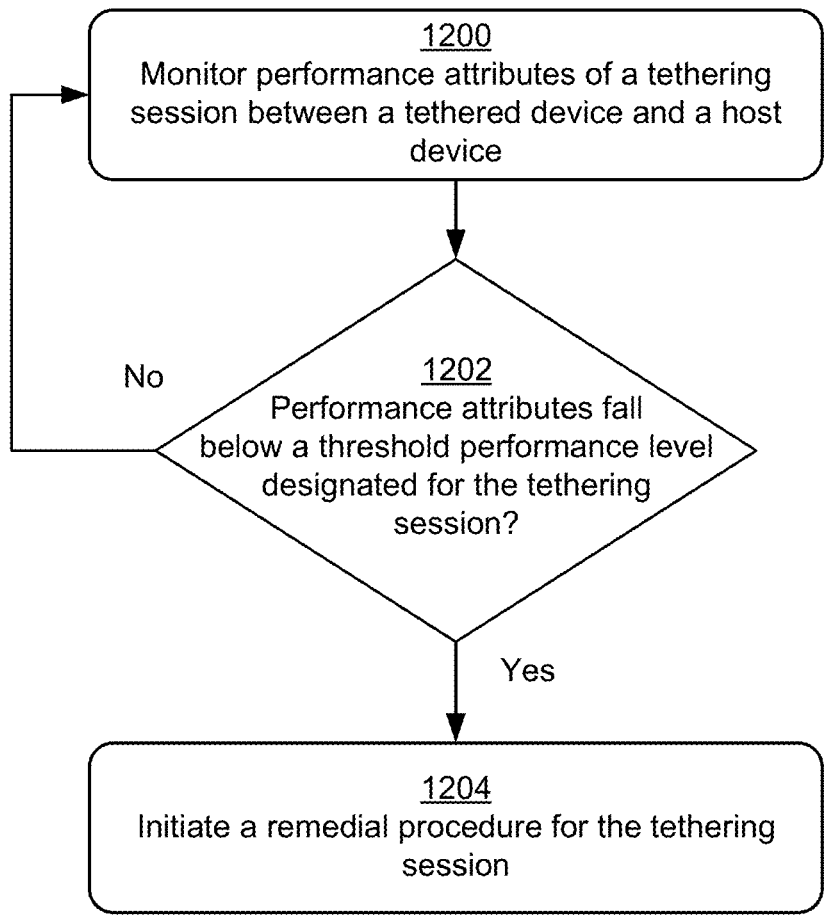
FIG. 12 is a flow diagram that describes steps in a method for monitoring tethering performance in accordance with one or more implementations.

FIG. 12 is a flow diagram that describes steps in a method for monitoring tethering performance in accordance with one or more implementations. In at least some implementations, the method can be performed by a host device and/or a tethering service.

Step 1200 monitors performance attributes of a tethering session between a tethered device and a host device. The host device 102, for instance, monitors wireless performance of a connection of the tethered device 110 to the host device 102. Examples of such performance attributes include bandwidth between the tethered device and the host device, signal-to-noise ratio, packet error rate, jitter, and so forth.

Step 1202 ascertains whether the performance attributes fall below a threshold performance level designated for the tethering session. The threshold performance level, for instance, may correspond to a minimum bandwidth, a minimum signal-to-noise ratio, a maximum allowed packet error rate, and so forth.

In at least some implementations, the threshold performance level may be defined based on attributes of the tethered device, such as whether a user of the tethered device is a standard user, a premium user, and so forth. A premium user, for instance, may be entitled to a higher minimum performance threshold than a standard user.

Alternatively or additionally, the threshold performance level may be defined based on a data type and/or application type that is transmitted and/or received by the tethered device. Some applications and/or data types (e.g., priority applications and/or priority data types), for instance, may be entitled to a higher minimum performance threshold than other applications and/or data types.

If the performance attributes do not fall below the threshold performance level ("No"), the method returns to step 1200. If the performance attributes fall below the threshold performance level ("Yes"), step 1204 initiates a remedial procedure for the tethering session. The host device 102, for instance, may increase the bandwidth allocated to the tethered device 110.

In at least some implementations, the remedial procedure may include a performance query to the spectrum manager 124 that indicates that performance attributes of the tethering session have fallen below a threshold performance level. In response to the performance query, the spectrum manager 124 may select additional wireless channels and/or higher quality wireless channels than those currently being used by the host device 102. The spectrum manager 124 may then return a performance notification to the host device 102 that identifies the wireless channels. The host device 102 may add the wireless channels to a set of channels currently being used, and/or may switch from a current channel/set of channels to those identified in the performance notification. Thus, implementations provide ways for dynamically adjusting to performance degradation in a tethering session.

Figure 13:
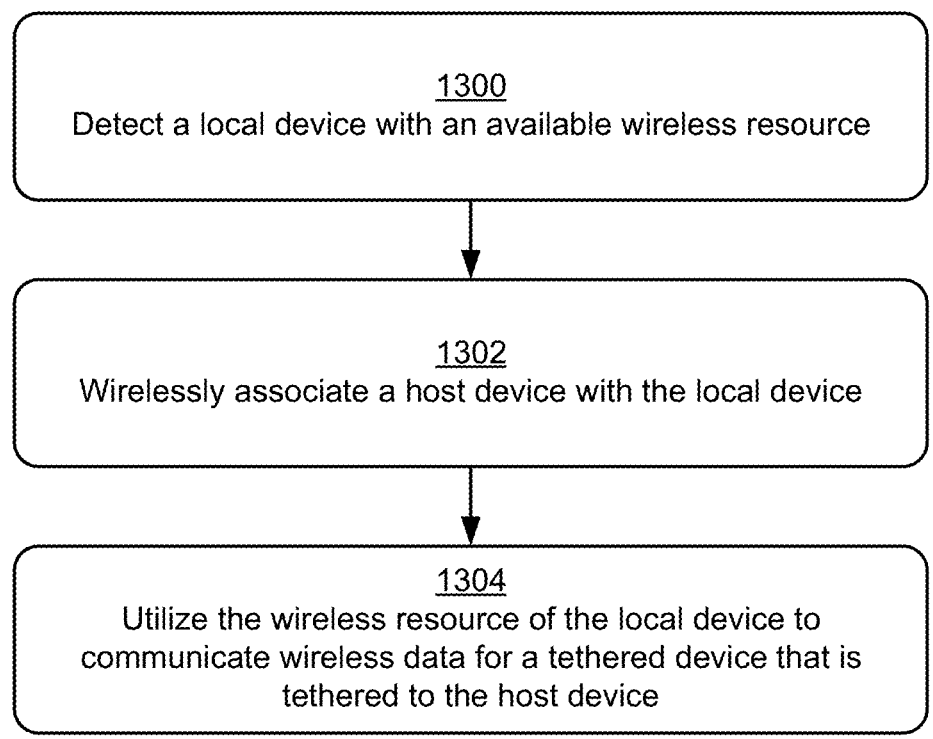
FIG. 13 is a flow diagram that describes steps in a method for supplementing wireless resources of a host device in accordance with one or more implementations.

FIG. 13 is a flow diagram that describes steps in a method for supplementing wireless resources of a host device in accordance with one or more implementations. In at least some implementations, the method can be performed by a host device and/or a tethering service.

Step 1300 detects a local device with an available wireless resource. The host device 102, for instance, detects that the client device 402 is in proximity and has available wireless resources, such as available wireless bandwidth and/or a wireless radio that is not in use.

Step 1302 wirelessly associates a host device with the local device. For example, the host device 102 establishes a wireless connection with the host device 102, such as via Wi-Fi™, Bluetooth, and/or other wireless technology.

Step 1304 utilizes the wireless resource of the local device to communicate wireless data for a tethered device that is tethered to the host device. The host device 102, for example, communicates data to and/or from the tethered device 110 utilizing wireless resources of the client device 402. Thus, wireless resources of the host device 102 and the client device 402 can be aggregated to increase the available wireless resources, such as for tethering and/or other wireless scenarios.

In at least some implementations, the increase in available wireless resources (e.g., bandwidth) can enable a tethering service upgrade offer to be communicated to a tethered device. For instance, the method discussed above with reference to FIG. 10 can be implemented in response to the increase in available wireless resources that results from connection of the host device 102 to the client device 402.

Having discussed some example procedures, consider now a discussion of an example system and device in accordance with one or more embodiments.

Example System and Device

Figure 14:
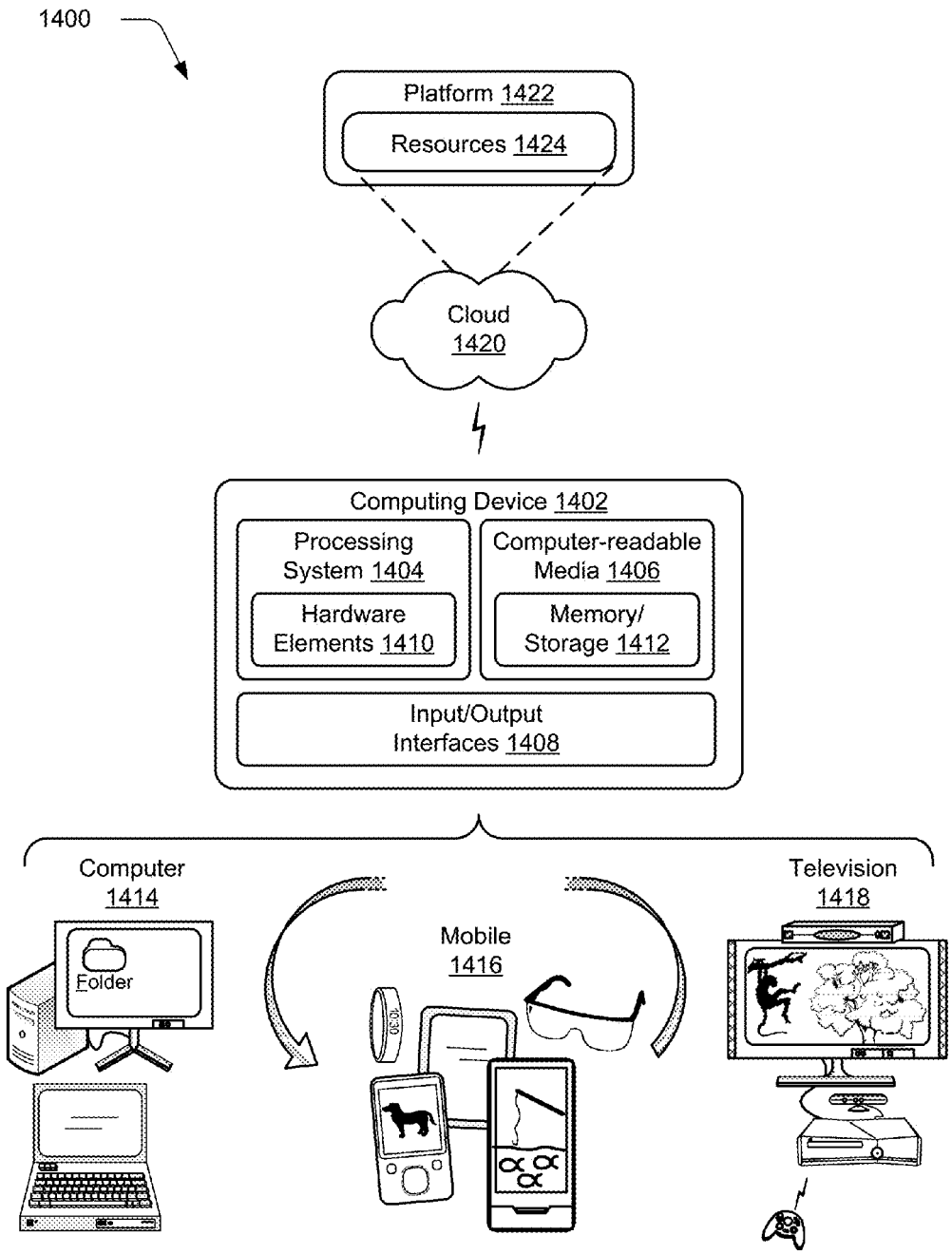
FIG. 14 illustrates an example system and computing device as described with reference to FIG. 1, which are configured to implement embodiments of techniques described herein.

FIG. 14 illustrates an example system generally at 1400 that includes an example computing device 1402 that is representative of one or more computing systems and/or devices that may implement various techniques described herein. For example, the client device 102 discussed above with reference to FIG. 1 can be embodied as the computing device 1402. The computing device 1402 may be, for example, a server of a service provider, a device associated with the client (e.g., a client device), an on-chip system, and/or any other suitable computing device or computing system.

The example computing device 1402 as illustrated includes a processing system 1404, one or more computer-readable media 1406, and one or more I/O Interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1406 is illustrated as including memory/storage 1412. The memory/storage 1412 represents memory/storage capacity associated with one or more computer-readable media. The memory/storage 1412 may include volatile media (such as random access memory (RAM)) and/or nonvolatile media (such as read only memory (ROM), Flash memory, optical disks, magnetic disks, and so forth). The memory/storage 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of modules as a module that is executable by the computing device 1402 as software may be achieved at least partially in hardware, e.g., through use of computer-readable storage media and/or hardware elements 1410 of the processing system. The instructions and/or functions may be executable/operable by one or more articles of manufacture (for example, one or more computing devices 1402 and/or processing systems 1404) to implement techniques, modules, and examples described herein.

As further illustrated in FIG. 14, the example system 1400 enables ubiquitous environments for a seamless user experience when running applications on a personal computer (PC), a television device, and/or a mobile device. Services and applications run substantially similarly in all three environments for a common user experience when transitioning from one device to the next while utilizing an application, playing a video game, watching a video, and so on.

In the example system 1400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1402 may assume a variety of different configurations, such as for computer 1414, mobile 1416, and television 1418 uses. Each of these configurations includes devices that may have generally different constructs and capabilities, and thus the computing device 1402 may be configured according to one or more of the different device classes. For instance, the computing device 1402 may be implemented as the computer 1414 class of a device that includes a personal computer, desktop computer, a multi-screen computer, laptop computer, netbook, and so on.

The computing device 1402 may also be implemented as the mobile 1416 class of device that includes mobile devices, such as a mobile phone, a wearable device, portable music player, portable gaming device, a tablet computer, a multi-screen computer, and so on. The computing device 1402 may also be implemented as the television 1418 class of device that includes devices having or connected to generally larger screens in casual viewing environments. These devices include televisions, set-top boxes, gaming consoles, and so on.

The techniques described herein may be supported by these various configurations of the computing device 1402 and are not limited to the specific examples of the techniques described herein. For example, functionalities discussed with reference to the host device 102 and/or the spectrum manager 124 may be implemented all or in part through use of a distributed system, such as over a "cloud" 1420 via a platform 1422 as described below.

The cloud 1420 includes and/or is representative of a platform 1422 for resources 1424. The platform 1422 abstracts underlying functionality of hardware (e.g., servers) and software resources of the cloud 1420. The resources 1424 may include applications and/or data that can be utilized while computer processing is executed on servers that are remote from the computing device 1402. Resources 1424 can also include services provided over the Internet and/or through a subscriber network, such as a cellular or Wi-Fi™ network.

The platform 1422 may abstract resources and functions to connect the computing device 1402 with other computing devices. The platform 1422 may also serve to abstract scaling of resources to provide a corresponding level of scale to encountered demand for the resources 1424 that are implemented via the platform 1422. Accordingly, in an interconnected device embodiment, implementation of functionality described herein may be distributed throughout the system 1400. For example, the functionality may be implemented in part on the computing device 1402 as well as via the platform 1422 that abstracts the functionality of the cloud 1420.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for tethering parameters for a tethering connection are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
one or more processors; and
one or more computer-readable storage media storing computer-executable instructions that are executable by the one or more processors to perform operations including:
receiving at a host device a tethering request from a requesting device to establish a tethered connection to the host device;
generating a tethering query that includes attributes of the requesting device and a location of the host device;
communicating the tethering query to a tethering service; and
receiving a tethering response that includes tethering parameters to be applied to a tethered connection with the requesting device, and identifiers for one or more wireless channels for use by the host device to communicate wireless data for the requesting device.

2. A system as described in claim 1, wherein the tethering request includes at least one of an identifier for the requesting device or an identifier for an application of the requesting device, and wherein the attributes of the requesting device included in the tethering query include the at least one of the identifier for the requesting device or the identifier for the application of the requesting device.

3. A system as described in claim 1, wherein said generating comprises generating the tethering query to include one or more attributes of the host device including at least one of an identifier for the host device or tethering parameters for the host device.

4. A system as described in claim 1, further comprising at least one of creating or updating a user profile for the requesting device to include the tethering parameters to be applied to the tethered connection with the requesting device.

5. A system as described in claim 1, wherein the tethering parameters include at least one of a service level or a quality of service to be applied to data of the requesting device, and wherein the method further comprises applying at least one of the service level or the quality of service to data of the requesting device.

6. A system as described in claim 1, wherein the tethering parameters indicate that the requesting device is entitled to a premium service level, and wherein the method further comprises providing enhanced tethering service to the requesting device based on the premium service level.

7. A system as described in claim 1, further comprising:
monitoring data usage for a tethering session between the requesting device and the host device; and
in an event that the data usage exceeds a threshold data usage for the tethering session, initiating a throttling procedure for the tethering session that throttles at least one wireless resource allocated to the requesting device.

8. A system as described in claim 1, further comprising monitoring one or more performance attributes of a tethering session between the requesting device and the host device; and
in an event that the one or more performance attributes fall below a threshold performance level designated for the tethering session, initiating a remedial procedure for the tethering session.

9. A system as described in claim 8, wherein the remedial procedure comprises submitting a performance query to a tethering service indicating that the one or more performance attributes have fallen below a threshold performance level designated for the tethering session.

10. One or more hardware computer-readable storage media having instructions stored thereon that, responsive to execution by a computing device, cause the computing device to perform operations comprising:
receiving a tethering query that includes a location of a host device and one or more attributes of a requesting device that requests to tether to the host device;
selecting, based on the location of the host device and the one or more attributes of the requesting device, at least one wireless channel to assign to the host device for wireless data communication;
generating a tethering response that identifies the at least one wireless channel and one or more tethering parameters to be applied to a tethered connection between the requesting device and the host device; and
communicating the tethering response for receipt by the host device.

11. One or more computer-readable storage media as recited in claim 10, wherein the one or more attributes of the requesting device include at least one of an identifier for the requesting device or an identifier for an application of the requesting device, and wherein said selecting comprises selecting the at least one wireless channel based on the identifier for the requesting device or the identifier for an application.

12. One or more computer-readable storage media as recited in claim 10, wherein the operations further comprise ascertaining based on the one or more attributes of the requesting device that the requesting device is entitled to a premium tethering service level, and wherein said selecting comprises selecting the at least one wireless channel to enable the host device to provide the premium tethering service level to the requesting device.

13. One or more computer-readable storage media as recited in claim 10, wherein the one or more attributes of the requesting device include an identifier for an application of the requesting device, and wherein the operations further comprise:
    ascertaining based on the identifier for the application that the application is entitled to priority access to at least one wireless resource, and wherein the one or more tethering parameters indicate that the application is entitled to priority access to the at least one wireless resource.

14. One or more computer-readable storage media as recited in claim 10, wherein the operations further comprise:
    presenting a query to the requesting device that offers an upgrade to a tethered connection between the requesting device and the host device; and
    in an event that an indication is received that the user accepts the offer to upgrade, upgrading the tethered connection between the requesting device and the host device.

15. One or more computer-readable storage media as recited in claim 14, wherein said upgrading comprises allocating at least one additional wireless channel for the host device, and wherein the operations further comprise notifying the host device of the at least one additional wireless channel to enable the host device to provide an enhanced tethering service level for the tethered connection.

16. One or more computer-readable storage media as recited in claim 10, wherein the at least one wireless channel comprises at least one of a television whitespace or an available cellular channel.

17. A computer-implemented method comprising:
    communicating a tethering query to a tethering service that includes attributes of a requesting device that requests to tether to a host device, and a location of the host device;
    receiving a tethering response that includes tethering parameters to be applied to a tethered connection with the requesting device, and one or more identifiers for one or more wireless channels for use by the host device to communicate wireless data for the requesting device; and
    applying the tethering parameters to a tethered connection with the requesting device including utilizing by the host device the one or more wireless channels to communicate wireless data for the requesting device.

18. The computer-implemented method as described in claim 17, further comprising presenting a graphical user interface (GUI) that indicates that the requesting device is tethered to the host device, and that enables one or more of the tethering parameters to be configured.

19. The computer-implemented method as described in claim 17, further comprising presenting a graphical user interface (GUI) that enables one or more devices associated with a user of the host device to be identified such that the one or more devices associated with the user are differentiable from tethered devices not associated with the user.

20. The computer-implemented method as described in claim 17, further comprising:
    receiving an indication of an upgrade to the tethered connection; and
    applying an enhanced service level to one or more attributes of the tethered connection.

* * * * *